United States Patent
Chun

(10) Patent No.: US 7,774,813 B2
(45) Date of Patent: Aug. 10, 2010

(54) APPARATUS AND METHOD FOR CHECKING FOR BROADCASTING SCHEDULE OVERLAP IN BROADCASTING SYSTEM

(75) Inventor: Sang-Kun Chun, Seoul (KR)

(73) Assignee: Samsung Electronics Co., Ltd., Suwon-si (KR)

(*) Notice: Subject to any disclaimer, the term of this patent is extended or adjusted under 35 U.S.C. 154(b) by 415 days.

(21) Appl. No.: 11/606,017

(22) Filed: Nov. 30, 2006

(65) Prior Publication Data
US 2007/0139554 A1 Jun. 21, 2007

(30) Foreign Application Priority Data
Dec. 19, 2005 (KR) .................. 10-2005-0125594

(51) Int. Cl.
| H04N 5/445 | (2006.01) |
| H04N 7/173 | (2006.01) |
| H04N 7/00 | (2006.01) |
| H04N 11/00 | (2006.01) |
| G06F 15/16 | (2006.01) |
| G06F 15/173 | (2006.01) |
| G06F 11/00 | (2006.01) |
| H04L 12/28 | (2006.01) |
| H04L 12/56 | (2006.01) |

(52) U.S. Cl. .................. 725/54; 348/468; 725/97; 725/95; 370/230; 370/390; 709/204; 709/241

(58) Field of Classification Search .................. None
See application file for complete search history.

(56) References Cited

U.S. PATENT DOCUMENTS

| 5,576,755 A | * | 11/1996 | Davis et al. .................. 725/48 |
| 5,600,794 A | * | 2/1997 | Callon .................. 709/241 |
| 5,731,844 A | * | 3/1998 | Rauch et al. .................. 725/40 |
| 5,835,634 A | * | 11/1998 | Abrams .................. 382/222 |
| 7,222,155 B1 | * | 5/2007 | Gebhardt et al. .................. 709/204 |
| 7,304,945 B1 | * | 12/2007 | Vishnu .................. 370/230 |
| 7,389,523 B2 | * | 6/2008 | Kikinis .................. 725/46 |

(Continued)

FOREIGN PATENT DOCUMENTS

JP 2001-086082 3/2001

(Continued)

OTHER PUBLICATIONS

Korean Decision of Grant corresponding to Korean Patent Application No. 10-2005-0125594, issued on Jun. 28, 2007.

(Continued)

*Primary Examiner*—Joseph P Hirl
*Assistant Examiner*—Mary Anne Kay
(74) *Attorney, Agent, or Firm*—H. C. Park & Associates, PLC

(57) ABSTRACT

A broadcasting system includes a broadcasting server which checks for overlap in a broadcasting schedule. The broadcasting server performs an operation on a first bit map corresponding to service time information of each program on each of at least one channel and a second bit map corresponding to service time information of a new program, and additionally arranges the new program. The broadcasting system providing broadcasting service through a variety of networks, enables a broadcasting program schedule to be managed efficiently, and performs a schedule overlap check so as to arrange a new program to be performed in a minimum amount of time.

15 Claims, 12 Drawing Sheets

U.S. PATENT DOCUMENTS

| | | | |
|---|---|---|---|
| 2002/0073425 A1* | 6/2002 | Arai et al. | 725/44 |
| 2002/0120931 A1* | 8/2002 | Huber et al. | 725/34 |
| 2003/0110500 A1* | 6/2003 | Rodriguez | 725/46 |
| 2006/0253867 A1* | 11/2006 | Potrebic et al. | 725/50 |
| 2007/0025350 A1* | 2/2007 | Kyung et al. | 370/390 |

FOREIGN PATENT DOCUMENTS

| | | |
|---|---|---|
| JP | 2001-268600 | 9/2001 |
| JP | 2002-010235 | 1/2002 |
| JP | 2003-009119 | 1/2003 |
| JP | 2004-320435 | 11/2004 |
| KR | 1999-0088070 | 12/1999 |
| KR | 1020000059989 | 10/2000 |
| KR | 1020030061599 | 7/2003 |
| WO | 2005/101250 | 10/2005 |

OTHER PUBLICATIONS

Office action from Japanese Patent Office issued in Applicant's corresponding Japanese Patent Application No. 2006-337531 dated Aug. 11, 2009 with its English translation.

* cited by examiner

| SCHEDULE INFORMATION TABLE | | |
|---|---|---|
| CHANNEL | PROGRAM | SERVICE TIME |
| Channel #1 | Program #1 | 00:00 ~ 01:20 |
| Channel #1 | Program #2 | 04:00 ~ 05:00 |
| Channel #1 | Program #3 | 15:00 ~ 17:00 |
| Channel #2 | Program #1 | 00:00 ~ 01:20 |
| Channel #2 | Program #2 | 04:00 ~ 05:00 |
| Channel #3 | Program #1 | 00:00 ~ 01:20 |
| Channel #3 | Program #2 | 04:00 ~ 05:00 |

FIG. 4

| SCHEDULE INFORMATION TABLE | | |
|---|---|---|
| CHANNEL | PROGRAM | SERVICE TIME |
| Channel #1 | Program #1 | 00:00 ~ 01:20 |
| Channel #1 | Program #2 | 04:00 ~ 05:00 |
| Channel #1 | Program #3 | 15:00 ~ 17:00 |
| Channel #2 | Program #1 | 00:00 ~ 01:20 |
| Channel #2 | Program #2 | 04:00 ~ 05:00 |
| Channel #3 | Program #1 | 00:00 ~ 01:20 |
| Channel #3 | Program #2 | 04:00 ~ 05:00 |

| BIT MAP TABLE | |
|---|---|
| CHANNEL | FIRST BIT MAP |
| Channel #1 | 0100..............................0000 |
| Channel #2 | 1111..............................1111 |
| Channel #3 | 1010..............................0011 |

| NEW PROGRAM | 14:00 ~ 14:59 |
|---|---|

| SECOND BIT MAP |
|---|
| 0000..............................0000 |

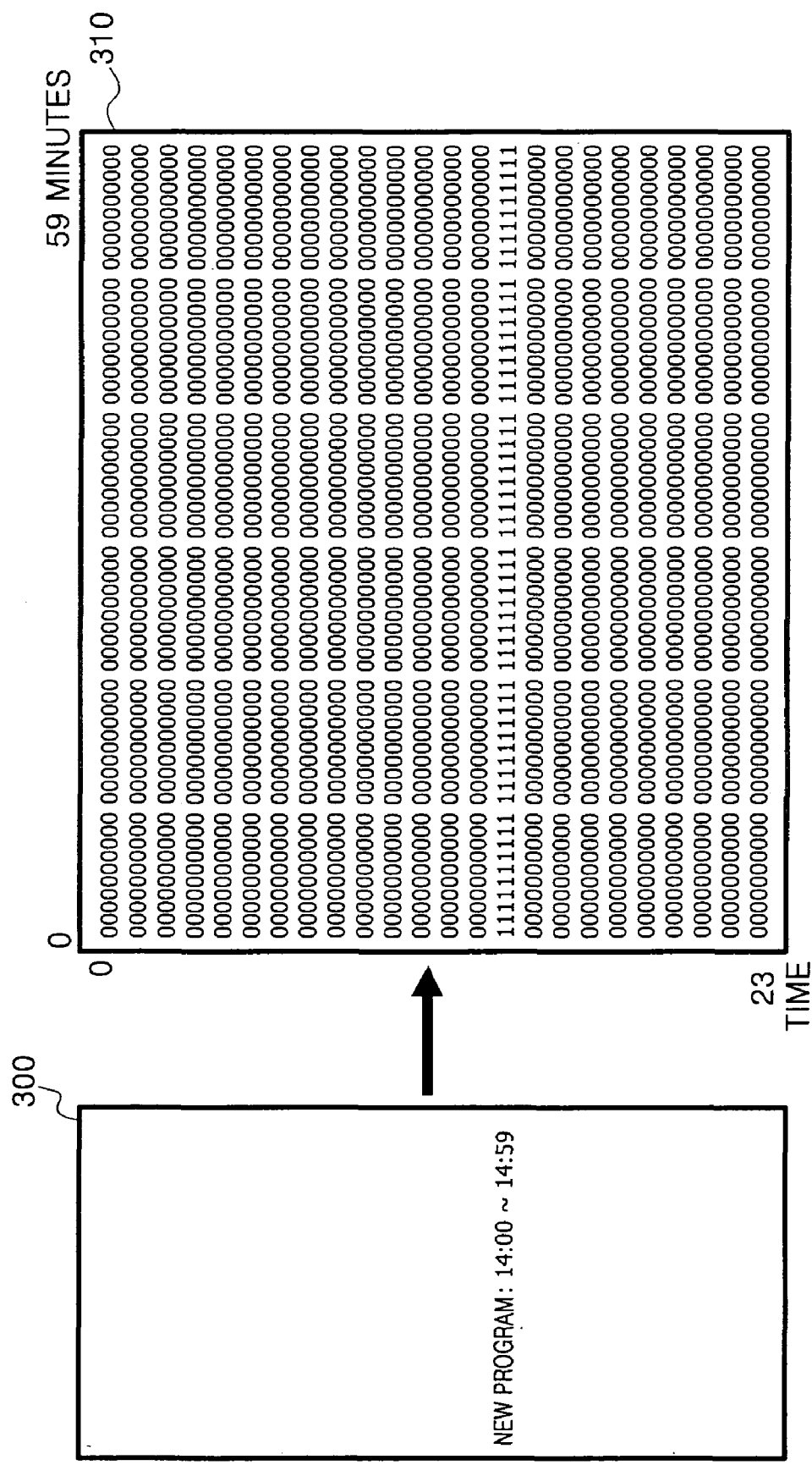

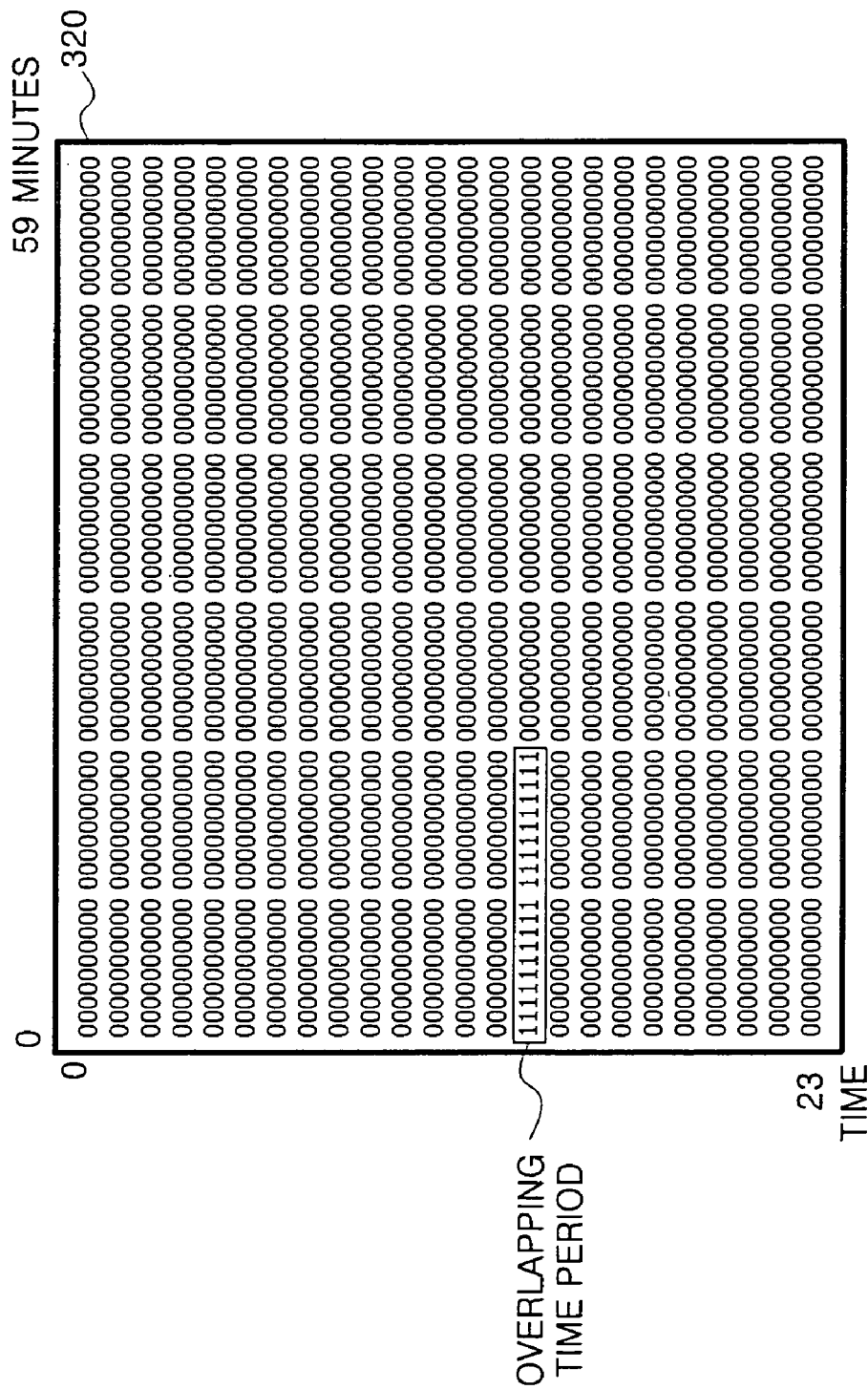

APPARATUS AND METHOD FOR CHECKING FOR BROADCASTING SCHEDULE OVERLAP IN BROADCASTING SYSTEM

CLAIM OF PRIORITY

This application makes reference to, incorporates the same herein, and claims all benefits accruing under 35 U.S.C. §119 from an application for APPARATUS AND METHOD FOR CHECKING FOR BROADCASTING SCHEDULE OVERLAP IN BROADCASTING SYSTEM earlier filed in the Korean Intellectual Property Office on 19 of Dec. 2005 and there duly assigned Ser. No. 10-2005-0125594.

BACKGROUND OF THE INVENTION

1. Technical Field

The present invention relates to an apparatus and method for checking for broadcasting schedule overlap in a broadcasting system.

2. Related Art

Recent developments in network technology have disclosed a way of going beyond traditional aerial broadcasting services, and have prompted the development of broadcasting services that can be provided through various media, such as wireless networks, Internet protocol (IP) networks, cable networks and satellite networks.

Such broadcasting services, provided through various media, include a satellite/terrestrial digital multimedia broadcasting service, a video on demand (VOD) service, an electronic program guide (EPG) service, an individual broadcasting service, and so on. Broadcasting formats of the broadcasting services have also become varied.

Furthermore, a common characteristic of broadcasting services provided through various media is that a volume of content (programs, channels) can be provided through an advanced network.

The time taken for a broadcasting provider who provides the broadcasting services to arrange a broadcasting schedule increases as much as the volume of content.

As such, since the service time information of the new program is sequentially compared to the service time information of each program on each channel on a one-by-one basis, in the conventional method of checking for broadcasting schedule overlap, the time taken to perform the check increases in proportion to the number of existing broadcast programs.

Furthermore, in order to arrange the new program regardless of broadcasting channels, the overlap check time sharply increases in proportion to the number of channels and programs.

For example, if there are a hundred channels with thirty programs on each channel, the check for overlap to arrange the new program may be repeated up to 3,000 times, which may take, for example, 15 seconds.

Furthermore, since the check for overlap of the new program with the arranged programs is performed 3,000 times in one day, the total time consumed in performing the check in one week is 1 minute and 45 seconds, and in one month is 7 minutes and 30 seconds.

In checking for overlap in order to additionally arrange new programs, the broadcasting server of the broadcasting system should check for service time overlap and channel overlap with each program already arranged. Thus, the broadcasting time and channel of each program should be sequentially compared on a one-by-one basis. Accordingly, the time consumed in checking for overlap is proportional to the volume of broadcasting content.

Thus, the efficiency of the broadcasting server in managing the broadcasting schedule decreases, and the time taken to additionally arrange new programs increases, making it impossible to provide subscribers with rapid broadcasting service.

SUMMARY OF THE INVENTION

It is, therefore, an objective of the present invention to provide an apparatus and method for checking for broadcasting schedule overlap in a broadcasting system, the apparatus and method being capable of minimizing check for overlap time to additionally arrange new programs, as well as efficiently managing the broadcasting schedule in the broadcasting system.

According to an aspect of the present invention, a broadcasting system comprises: a broadcasting server for generating a first bit map and a second bit map for determining whether service time information of a new program overlaps that of existing programs by comparing bit values of the first bit map with bit values of the second bit map; the first bit map being set to correspond to service time information of each program on at least one channel; and the second bit map being set to correspond to service time information of the new program.

The broadcasting server preferably comprises: a schedule arrangement unit for arranging at least one program on each channel; a bit map configuration unit for generating the first bit map set corresponding to the service time information of programs on each channel arranged in the schedule arrangement unit and the second bit map set corresponding to the service time information of the new program; and an overlap check unit for determining whether the service time information of the new program overlaps that of existing programs by comparing the bit values of the first bit map with the bit values of the second bit map.

The bit map configuration unit generates the bit map by dividing the service time period of the program into units of days, weeks, months or years, and configures each bit map by dividing each bit of the bit map into units of hours, minutes or seconds and setting bits of the bit map in correspondence to the service time information of each program.

The overlap check unit additionally arranges the new program according to bits set in a third bit map resulting from performing repeated AND operations on the first bit map and the second bit map.

When there are bits set in the third bit map resulting from the repeated AND operations on the first bit map and the second bit map, the overlap check unit determines that there is an existing program, the service time information of which overlaps that of the new program.

The overlap check unit generates a fourth bit map resulting from repeated OR operations between first bit maps of respective channels, and determines that there is a program having service time information which overlaps that of the new program when there are bits set in a third bit map resulting from an AND operation on the second bit map and the fourth bit map.

The overlap check unit includes at least one thread to operate values of predetermined bits of each bit map.

According to another aspect of the present invention, a broadcasting server of a broadcasting system comprises: a schedule arrangement unit for arranging at least one program on each of at least one channel; a bit map configuration unit for generating a first bit map set corresponding to service time information of programs on each channel arranged in the schedule arrangement unit and a second bit map set corresponding to service time information of a new program; and an overlap check unit for determining whether service time information of the new program overlaps that of an existing program according to a third bit map resulting from performing repeated AND operations on respective bits of the first bit map and the second bit map.

According to yet another aspect of the present invention, a broadcasting server of a broadcasting system comprises: a schedule arrangement unit for arranging at least one program on each of at least one channel; a bit map configuration unit for generating a first bit map set corresponding to service time information of programs on each channel arranged in the schedule arrangement unit and a second bit map set corresponding to service time information of a new program; and an overlap check unit for generating a fourth bit map resulting from repeated OR operations between the first bit maps, and for determining that there is a program having service time information which overlaps that of the new program when there are bits set in a third bit map resulting from an AND operation on respective bits of the second bit map and the fourth bit map.

According to yet another aspect of the present invention, a broadcasting server of a broadcasting system comprises: a schedule arrangement unit for arranging at least one program on each of at least one channel (Flow ID) based on a Broadcast/Multicast Service (BCMS) standard; a bit map configuration unit for generating a first bit map set corresponding to service time information of programs on each channel arranged in the schedule arrangement unit and a second bit map set corresponding to service time information of programs on a new channel; and an overlap check unit for determining that it is not possible to additionally arrange a new program, according to a third bit map resulting from repeated AND operations on respective bits of the first bit map and the second bit map, when the number of channels having service time information which overlaps that of the new program exceeds a predetermined number.

According to yet another aspect of the present invention, a method of checking for broadcasting schedule overlap in a broadcasting system comprises the steps of: arranging at least one program on each of at least one channel; configuring a first bit map in correspondence to service time information of the programs on each channel; configuring a second bit map in correspondence to service time information of a new program; and determining whether the new program can be additionally arranged according to a third bit map resulting from a sequential operation on respective bits of the first bit map and the second bit map.

The steps of configuring each bit map further comprises the steps of: generating the bit map by dividing a service time period of a program into units of days, weeks, months or years; and configuring the bit map by dividing each bit of the bit map into units of hours, minutes or seconds and setting the bits of the bit map in correspondence to service time information of the program.

The step of determining whether the new program can be additionally arranged further comprises the steps of: generating a third bit map resulting from an AND operation on the first bit map of the first channel and respective bits of the first bit maps; generating another third bit map resulting from an AND operation on respective bits of a first bit map of a next channel and the second bit map when there are bits set in the third bit map; arranging the new program additionally by selecting the corresponding channel as an additional channel when there are no bits set in the third bit map; and processing an additional arrangement of the new program as a failure when the channel is the last channel.

The step of determining whether the new program can be additionally arranged further comprises the steps of: generating a third bit map resulting from an AND operation on bits of the first bit map and the second bit map corresponding to a channel on which the new program is to be additionally arranged when the channel is determined; and determining that the new program cannot be arranged additionally when there are bits set in the third bit map.

The step of determining whether the new program can be arranged additionally comprises the steps of: generating a third bit map resulting from repeated OR operations on bits of the first bit map; generating a fourth bit map resulting from an AND operation on respective bits of the second bit map and the third bit map; determining that there is a channel having a service time which overlaps that of the new program when there are bits set in the fourth bit map; and determining that there is no channel having a service time which overlaps that of the new program when there are no bits set in the fourth bit map.

According to yet another aspect of the present invention, a method of checking for broadcasting schedule overlap in a broadcasting system comprises the steps of: arranging at least one program on each of at least one channel; configuring a first bit map in correspondence to service time information of the programs arranged on each channel; configuring a second bit map in correspondence to service time information of a new program; generating a third bit map resulting from repeated OR operations on bits of the first bit map; generating a fourth bit map resulting from an AND operation on respective bits of the second bit map and the third bit map; and determining that there is a channel having a service time which overlaps that of the new program when there are bits set in the fourth bit map.

According to yet another aspect of the present invention, a method of checking for broadcasting schedule overlap in a broadcasting system comprises the steps of: configuring a first bit map in correspondence to service time information of each program on each of at least one channel (Flow ID) based on a Broadcast/Multicast Service (BCMS) standard; configuring a second bit map in correspondence to service time information of programs on a new channel; identifying whether there are bits set in a third bit map resulting from repeated AND operations on bits of the first bit map and the second bit map; and determining that it is possible to additionally arrange programs when the number of third bit maps having bits set therein does not exceed a predetermined number.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein:

FIG. 4 is a diagram of a database in accordance with the present invention;

FIGS. 5A and 5B are diagrams showing the configuration of a bit map in accordance with the present invention;

FIG. 6 is a diagram illustrating the result of a check for overlap in accordance with an exemplary embodiment of the present invention;

DETAILED DESCRIPTION OF THE INVENTION

Hereinafter, exemplary embodiments of the present invention will be described in detail with reference to the accompanying drawings. In the following description, a detailed description of known functions and configurations incorporated herein has been omitted for conciseness.

Figure 1:
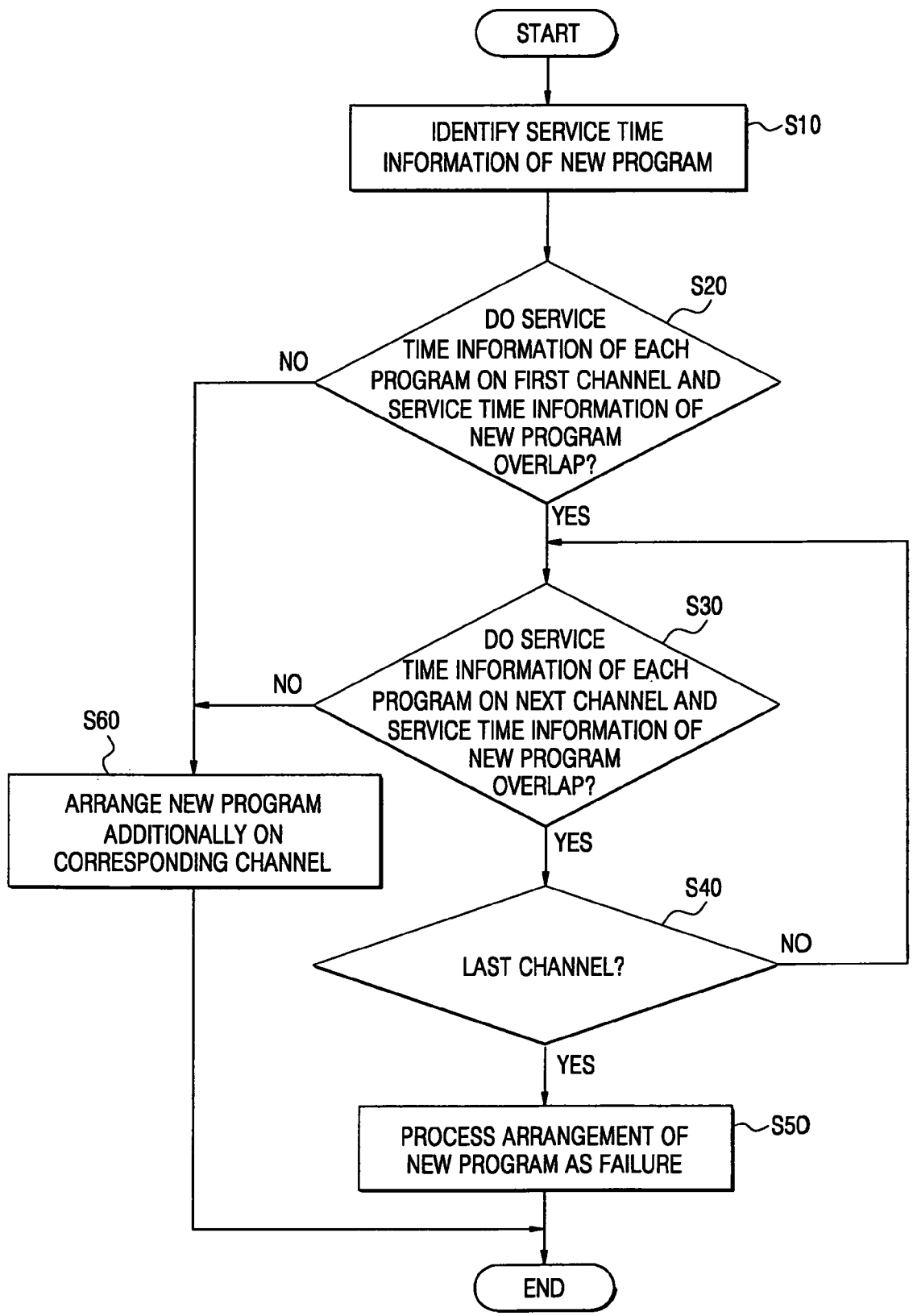
FIG. 1 is a flowchart of a method of checking for broadcasting schedule overlap in a general broadcasting system.

FIG. 1 is a flowchart of a method of checking for broadcasting schedule overlap in a general broadcasting system.

Referring to FIG. 1, when there is a new program to be arranged additionally, a broadcasting server of the broadcasting system identifies service time information of the new program (S10).

In this regard, the service time information may be a start time, an end time, or a duration of the program.

Furthermore, the broadcasting server compares the service time information of the new program with service time information of other programs on other channels arranged in a schedule information table stored in a data base.

Figure 2:
FIG. 2 is a diagram of a schedule information table which is generally stored in a data base.

FIG. 2 is a diagram of a schedule information table which is generally stored in a data base.

As shown in FIG. 2, the schedule information table 20 has identification information of each channel, identification information of each program on each channel, and service time information of each program and the like.

Referring to FIG. 1, the broadcasting server compares the service time information of the new program with the service time information of each program on a first channel to check for overlap (S20).

At this point, the broadcasting server sequentially compares the service time information of the new program with the service time information of each program (Program 190 1, #2 or #3) on the first channel (channel #1).

As a result of the comparison, when the service time information of the new program overlaps the service time information of one of more programs on the first channel, that is, when the service time information of the new program and the service time information of one or more programs on the first channel overlap, the broadcasting server compares the service time information of the new program with the service time information of each program on a second channel (a next channel) so as to check for overlap (S30).

Furthermore, when the service time information of the new program overlaps the service time information of one or more programs on a next channel, the broadcasting server determines whether the selected channel is the last channel (S40). When the selected channel is recognized to be the last channel, arrangement of the new program is processed as a failure (S50).

Meanwhile, when the service time information of the new program does not overlap the service time information of each program on a given channel (S20), the broadcasting server additionally arranges the new program on the corresponding channel (S60).

Figure 3:
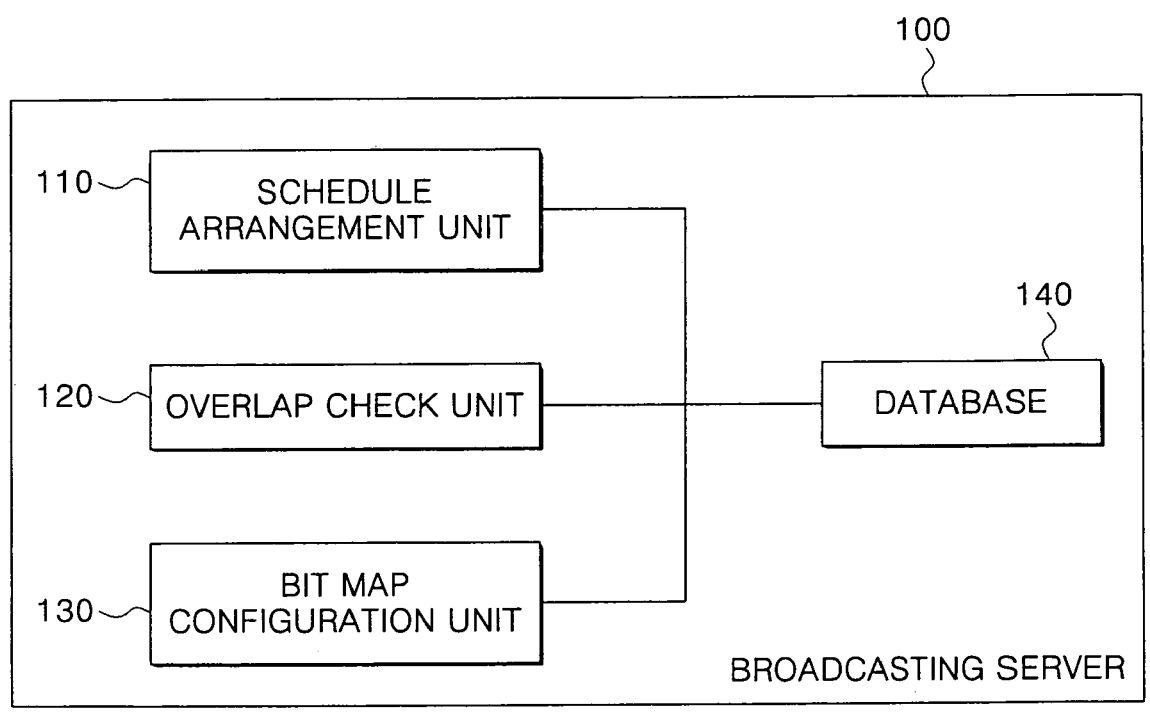
FIG. 3 is a block diagram of a broadcasting server of a broadcasting system in accordance with an exemplary embodiment of the present invention.

FIG. 3 is a block diagram of a broadcasting server of a broadcasting system in accordance with an exemplary embodiment of the present invention.

Referring to FIG. 3, a broadcasting server 100 of the present invention includes a schedule arrangement unit 110, an overlap check unit 120, a bit map configuration unit 130, and a database 140.

The schedule arrangement unit 110 arranges a number of broadcast programs on each channel, and stores a schedule information table in the database 140. Furthermore, the schedule arrangement unit 110 stores in the database 140 service time information of a new program that is additionally arranged.

The bit map configuration unit 130 configures a first bit map for each channel based on the service time information of the programs on the channel with reference to the schedule information table stored in the database 140. At this point, the bit map configuration unit 130 can set the service time information of each program in predetermined units, for example, hours, minutes or seconds.

Furthermore, the bit map configuration unit 130 can configure the bit map for each channel on a daily, weekly, or monthly basis.

The case wherein a check for overlap between an existing program and a new program is performed in units of minutes on a daily basis will be described below.

Furthermore, the bit map configuration unit 130 configures a second bit map based on service time information of the new program.

FIG. 4 is a diagram of a database in accordance with the present invention.

As shown in FIG. 4, the database 140 of the present invention stores a schedule information table 200 for storing identification information of each channel, identification information of programs on each channel and service time information of each program, a bit map table 300 for storing a number of first bit maps configured by the bit map configuration unit 130 with reference to the schedule information table 200, and a second bit map 310 configured with reference to a new schedule information table 210 based on service time information of the new program.

Figure 5A:
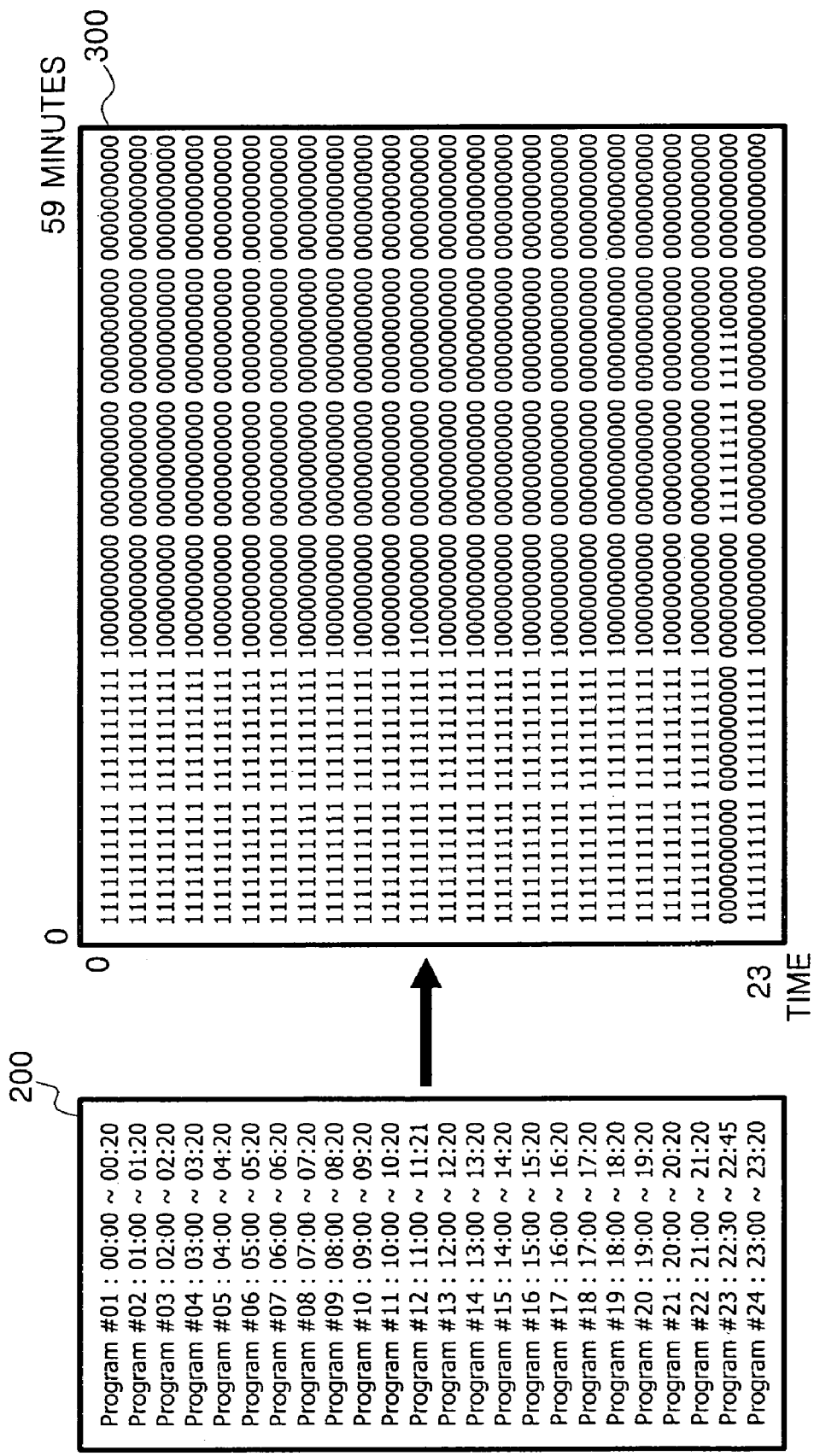

FIGS. 5A and 5B are diagrams showing the configuration of a bit map in accordance with the present invention.

As shown in FIG. 5A, the bit map configuration unit 130 configures a first bit map 300 such that a day is divided into units of minutes, for example, and a time period when a program is arranged has bit values different from a time period when no program is arranged.

Furthermore, the bit map configuration unit 130 configures the first bit map 300 such that the service time information of each program is identified in units of minutes, and bits corresponding to time when a program is arranged are set to different values than bits corresponding to time when no program is arranged.

For example, the bit map configuration unit 130 configures the first bit map 300 by setting bits corresponding to a time period when a program is arranged to 1, and bits corresponding to a time period when no program is arranged to 0.

The first bit map 300 shown in FIG. 5A is configured by the bit map configuration unit 130 such that the service time information of a program is expressed in units of minutes on the basis of a 24-hour day.

In the first bit map 300, each bit corresponds to a unit of one minute, a bit set to "1" means that a program is arranged during that minute, and a bit set to "0" means that no program is arranged during that minute.

FIG. 5B is a diagram illustrating a second bit map 310 configured by the bit map configuration unit 130 in accordance with the service time information 210 of a new program. In this case, the second bit map 310 is configured by setting bits corresponding to the service time information 210 of the new program to "1".

At this pont, the bit map configuration unit 130 can configure the bit maps 210 and 310 using a variety of functions according to application program schemes of the broadcasting server 100, for example:

1) Java application scheme: "Java Bitset Class" and built-in "Bitset Library"
2) C/C++ application scheme: built-in "Bitset Library"
3) Database 140 storage scheme: "BULK Type" such as "BLOB Type" (Oracle)
4) File type storage scheme: "Object based binary type" storage For example, when service time information of a program is 00:10-01:20, since the result of a calculation such as {intstartBit=startHour*60+startMin; int endBit=endHour*60+endMin+1} is startBit=10, endBit=81, the bit map configuration unit 130 configures the bit maps 210 and 310 by setting the 10th bit to the 81st bit to "1".

Meanwhile, the overlap check unit 120 of the broadcasting server 100 checks for program overlap by performing an operation on the first bit map 300 of each channel stored in the database 140 and the second bit map 310 based on the new program.

More specifically, the overlap check unit 120 determines whether there is overlap in the service time information by performing an AND operation on a bit value of the first bit map 300 of existing program service time information and a bit value of the second bit map 310 of the service time information of the new program.

That is, the overlap check unit 120 performs an AND operation on the first bit map 300 corresponding to the service time information of programs on a channel shown in FIG. 5A, and the second bit map 310 corresponding to the service time information of the new program shown in FIG. 5B.

FIG. 6 is a diagram of the result of a check for overlap in accordance with an exemplary embodiment of the present invention.

As shown in FIG. 6, "1" bits in a third bit map 320 resulting from the AND operation on the first bit map 300 shown in FIG. 5A and the second bit map 310 shown in FIG. 5B, indicate overlap of the service time information of a pre-arranged program and the new program, as determined by the overlap check unit 120.

In this regard, when the new program is to be arranged on a predetermined channel, the overlap check unit 120 performs the AND operation on the first bit map 300 of the corresponding channel and the second bit map 310 based on the service time information of the new program once. When the new program can be arranged on any channel, the overlap check unit 120 performs the AND operation repeatedly on the first bit map 300 of each channel and the second bit map 310.

Figure 7:
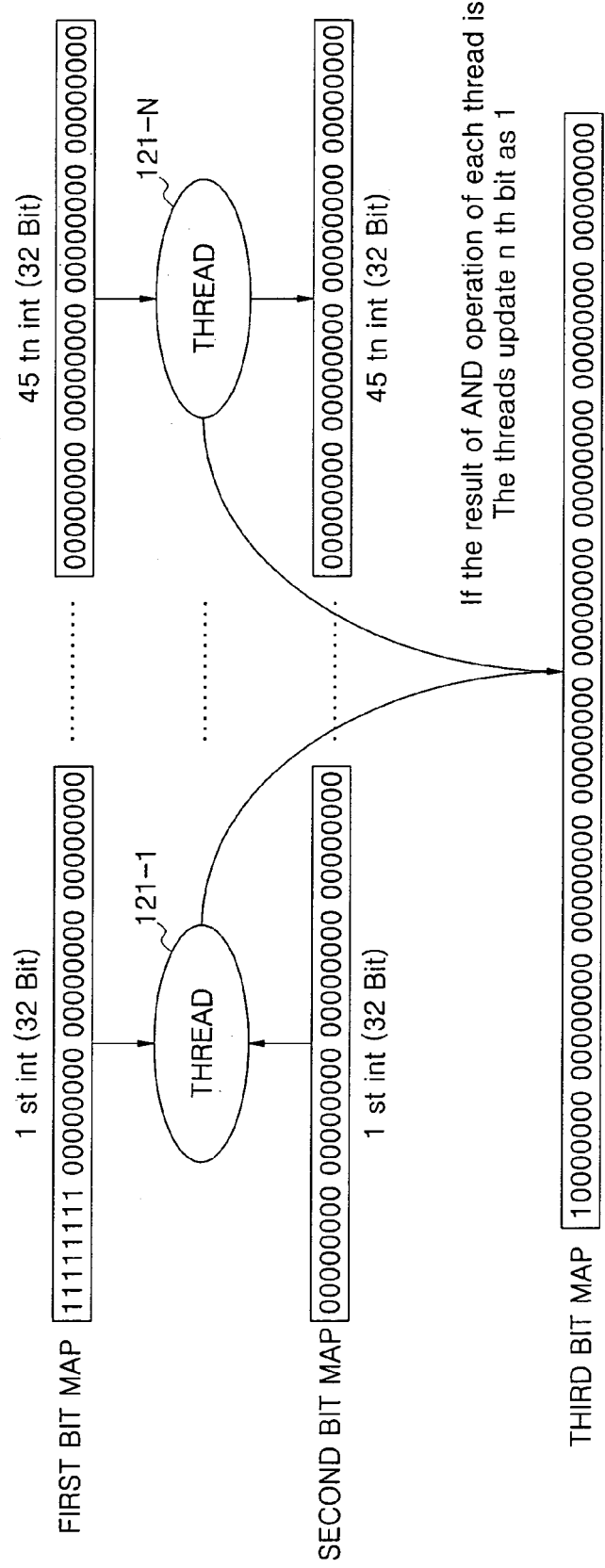
FIG. 7 is a conceptual diagram of threads in accordance with an exemplary embodiment of the present invention.

FIG. 7 is a conceptual diagram of threads in accordance with an exemplary embodiment of the present invention.

Referring to FIG. 7, the overlap check unit 120 includes 45 threads 121-1 to 121-N (N=45) capable of processing an AND operation on 32 bits so as to simultaneously perform an AND operation on 1440 bits of the first bit map 300 and 1440 bits of the second bit map 310.

In this regard, the number N of threads can be determined and included in the overlap check unit 120 according to an operation processing capability of the threads 121-1 to 121-N.

Figure 8:
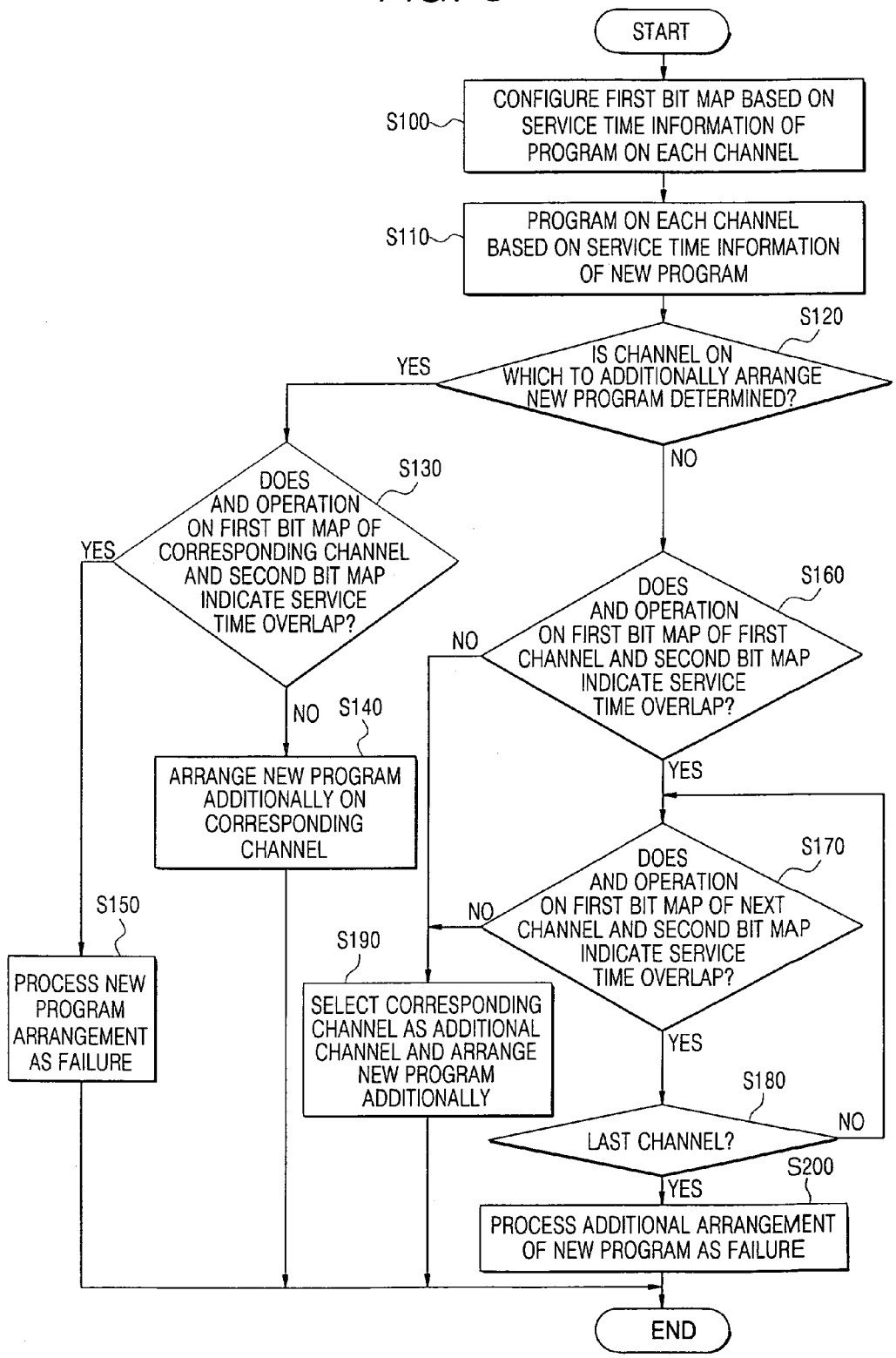
FIG. 8 is a flowchart of a method of checking for overlap in a broadcasting server in accordance with an exemplary embodiment of the present invention.

FIG. 8 is a flowchart of a method of checking for overlap in a broadcasting server in accordance with an exemplary embodiment of the present invention.

Referring to FIG. 8, the broadcasting server 100 configures the first bit map 300 for each channel based on the service time information of each program on each channel stored in the database 140 (S100).

That is, the broadcasting server 100 sets bits corresponding to the service time information of each program on each channel to "1" so as to configure the first bit map 300.

Furthermore, when the broadcasting server 100 additionally arranges a new program, it configures the second bit map 310 corresponding to the service time information of the new program (S110).

The broadcasting server 100 identifies whether a channel on which to additionally arrange a new program is determined (S120). When the channel on which the new program is to be additionally arranged is determined, the broadcasting server 100 identifies whether the service time information overlap by performing an AND operation on the first bit map 300 of the corresponding channel and the second bit map 310 (S130).

That is, the broadcasting server 100 identifies whether there are bits set to "1" in the third bit map 320 resulting from the AND operation on the first bit map 300 and the second bit map 310 of the corresponding channel. When there are no "1" bits (NO in S130), the broadcasting server 100 concludes that there is no overlap and additionally arranges the new program on the corresponding channel (S140), and when there are "1" bits (YES in S130), the broadcasting server 100 determines that the time periods corresponding to the "1" bits overlap and arrangement of the new program is processed as a failure (150).

Meanwhile, when there is no fixed channel for the new program to be additionally arranged (NO in S120), the broadcasting server 100 identifies whether there are "1" bits in the third bit map 320 resulting from the AND operation on the first bit map 300 of the first channel and the second bit map 310, and correspondingly whether the service time information overlap (S160).

Furthermore, when there are "1" bits in the third bit map 320 resulting from the AND operation on the first bit map 300 of the first channel and the second bit map 310 (YES in S160), the broadcasting server 100 identifies whether there are "1" bits in the third bit map 320 resulting from an AND operation on the first bit map 300 of a next channel and the second bit map 310, and thus whether the service time information overlap (S170).

When the service time information overlaps (YES in S170), the broadcasting server 100 identifies whether the selected channel is the last channel (S180). When the selected channel is not the last channel (NO in S180), the broadcasting server 100 selects a next channel and repeats step S170. When the selected channel is the last channel (YES in S180), the broadcasting server 100 processes the additional arrangement of the new program as a failure (S200).

Furthermore, when there are no "1" bits in one of the third bit maps 320 resulting from sequential AND operations on the first bit map 300 of each channel and the second bit map 310 (NO in S160), the broadcasting server 100 selects the corresponding channel for additional arrangement of the new program, and additionally arranges the new program in the corresponding channel (S190).

Meanwhile, the overlap check unit 120 of the broadcasting server 100 performs an OR operations between first bit maps 300 based on the service time information of every program on all channels, and configures a fourth bit map 330 corresponding to the service time information of each program on all channels.

Figure 9:
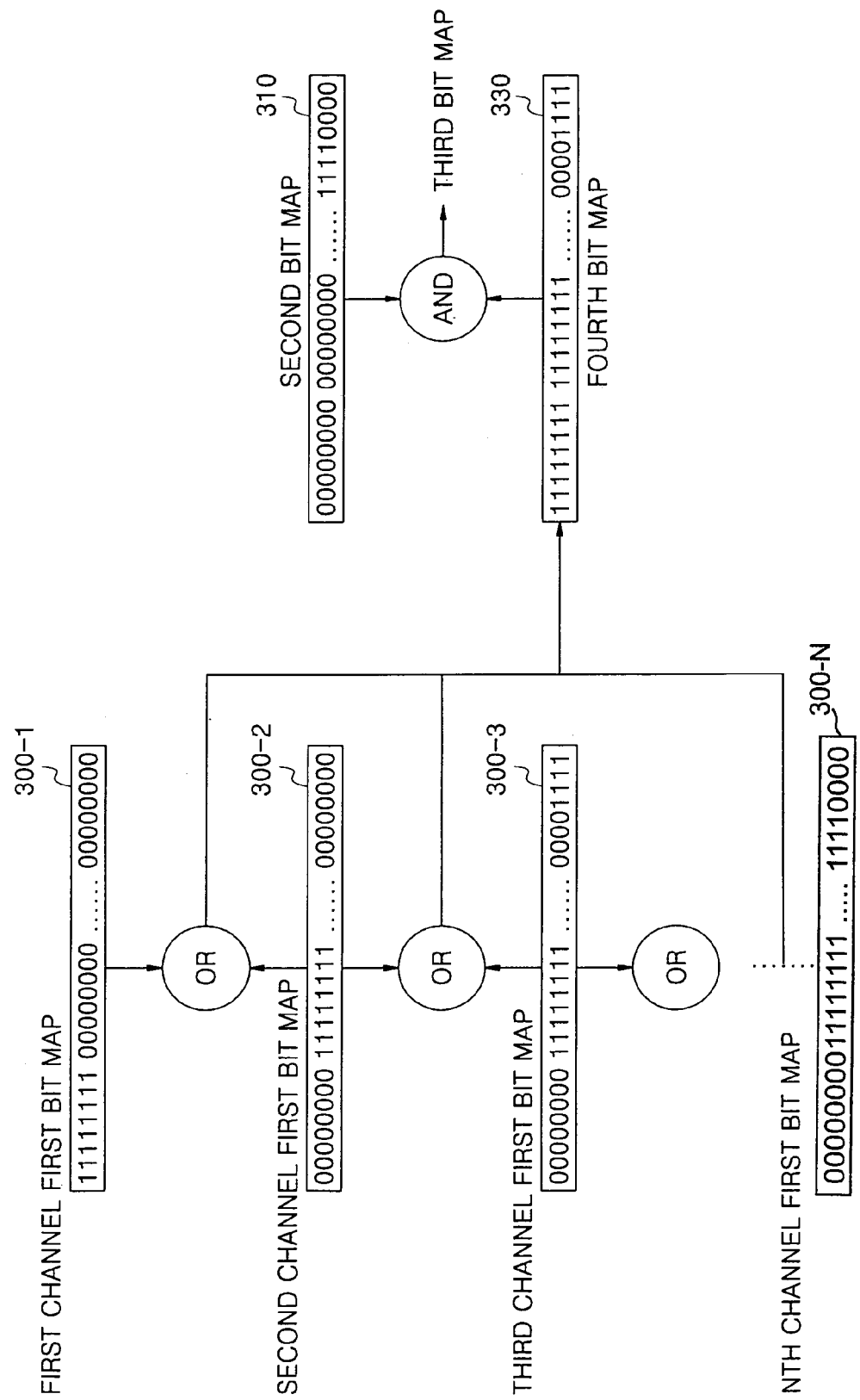
FIG. 9 is a conceptual diagram of a method of checking for overlap in accordance with another exemplary embodiment of the present invention.

FIG. 9 is a conceptual diagram of a method of checking for overlap in accordance with another exemplary embodiment of the present invention.

Referring to FIG. 9, the overlap check unit 120 performs an OR operation the first bit maps 300-1 to 300-N based on the service time information of programs on all channels, and configures a fourth bit map 330 corresponding to the service time information of the programs on all channels.

For example, in order for the broadcasting server 100 to identify whether a channel for additionally arranging a new program is determined, and whether the new program can be additionally arranged, the overlap check unit 120 configures the fourth bit map 330 such that everybit corresponding to the service time information of programs on all channels is set to "1".

Furthermore, the overlap check unit 120 performs an AND operation on the fourth bit map 330 based on the service time information of every program and the second bit map 310 based on the service time information of the new program, and identifies whether there is a program having service time information which overlaps that of the new program.

Figure 10:
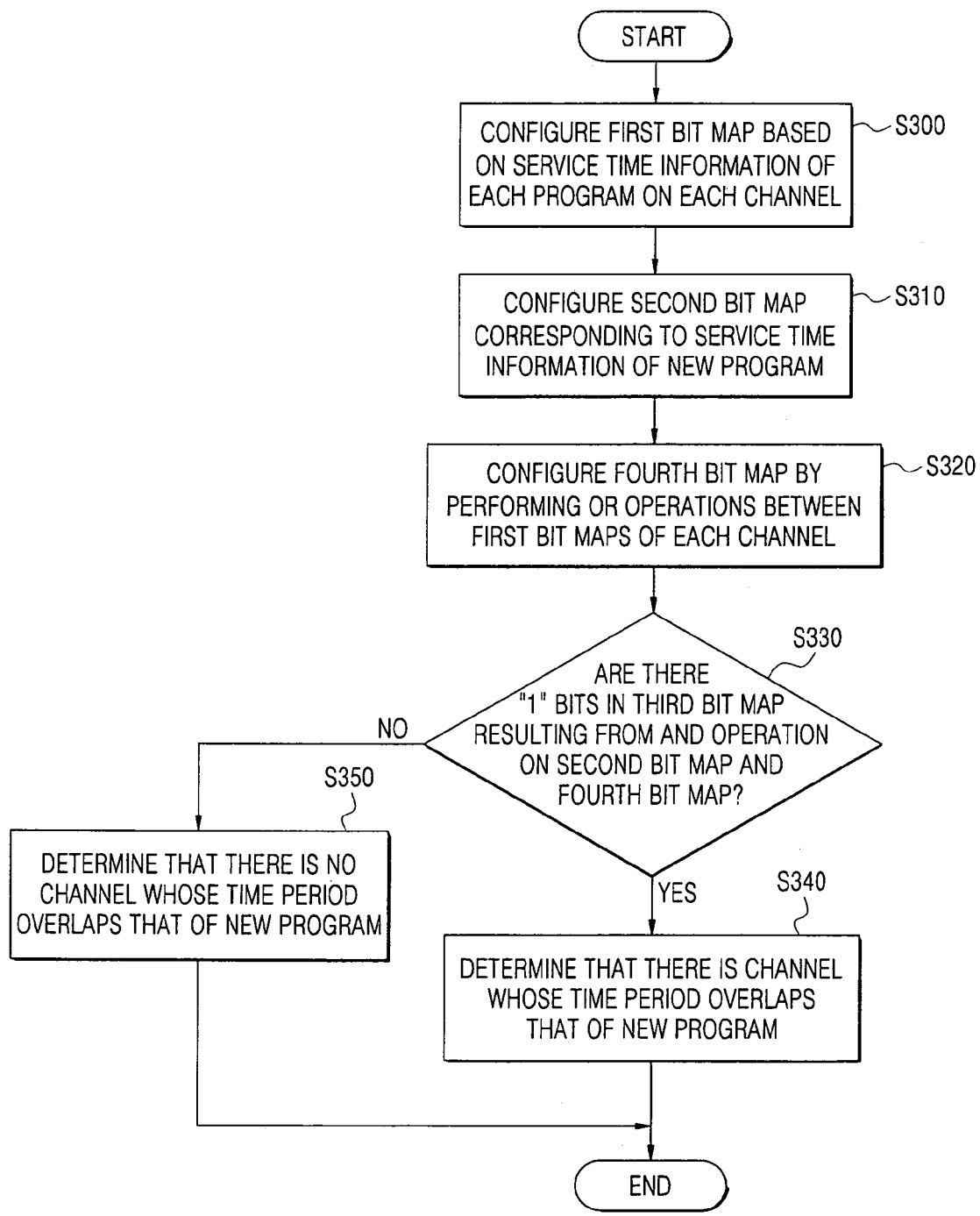
FIG. 10 is a flowchart of a method of checking for overlap performed by a broadcasting server in accordance with another exemplary embodiment of the present invention.

FIG. 10 is a flowchart of a method of checking for overlap performed by a broadcasting server in accordance with another exemplary embodiment of the present invention.

Referring to FIG. 10, the broadcasting server 100 of the broadcasting system configures the first bit map 300 for each channel based on the service time information of each program on each channel stored in the database 140 (S300). That is, the broadcasting server 100 configures a plurality of first bit maps 300 by setting bits corresponding to the service time information of each program on each channel to "1".

Furthermore, when the broadcasting server 100 additionally arranges a new program, it configures the second bit map 310 corresponding to the service time information of the new program (S330).

The broadcasting server 100 configures the fourth bit map 330 based on the service time information of every program by performing an OR operation on the first bit maps 310 of all channels (S320).

The broadcasting server 100 performs an AND operation on the second bit map 310 corresponding to the service time information of the new program and the fourth bit map 330, so as to identify whether service time information overlaps (S330).

That is, the broadcasting server 100 identifies whether there are "1" bits in the third bit map resulting from the AND operation on the fourth bit map 330 and the second bit map 310 (S330). When there are "1" bits in the third bit map 320 (YES in S330), the broadcasting server 100 determines that there is program overlap on a corresponding channel (S340).

When there are no "1" bits in the third bit map 320 resulting from the AND operation on the fourth bit map 330 and the second bit map 310 (NO in S330), the broadcasting server 100 determines that there is no channel with a program that overlaps the service time information of the new program (S350).

Figure 11:
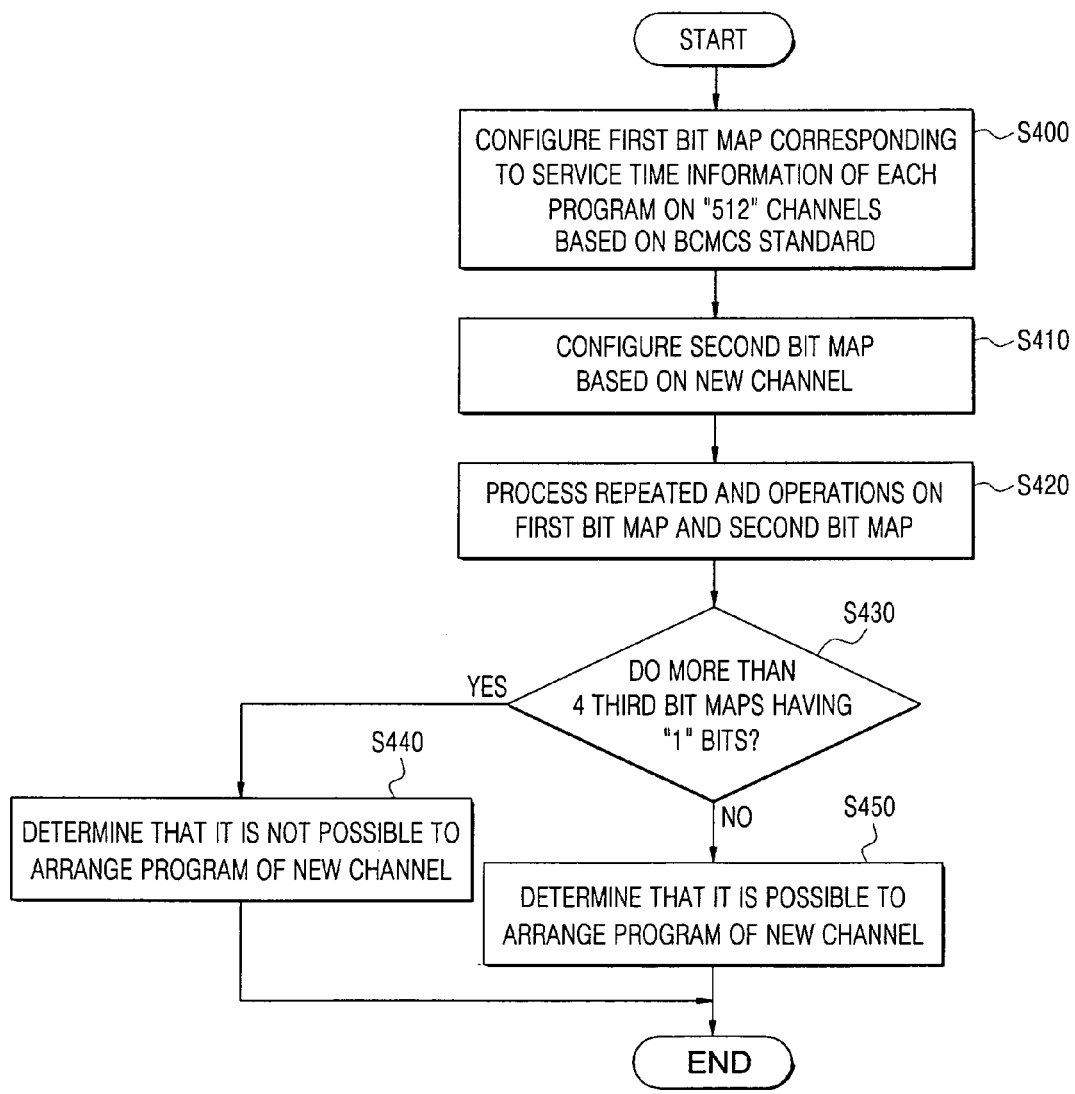
FIG. 11 is a flowchart of a method of checking for overlap in accordance with yet another exemplary embodiment of the present invention.

FIG. 11 is a flowchart of a method of checking for overlap in accordance with yet another exemplary embodiment of the present invention.

Referring to FIG. 11, a method by which the broadcasting server 100 provides a broadcasting service based on a Broadcast/Multicast Service (BCMCS) standard through a CDMA 2000 1xEV-DO network, and performs a check for overlap to register a new program in a state in which there are 24 programs on one channel (Flow ID) and 4 Flows capable of providing service concurrently, will be explained.

The maximum number of programs arranged already is 12288, since 24 programs are arranged on each of 512 channels (Flow ID). Thus, the broadcasting server 100 based on the BCMCS should perform a check for overlap of the service time information of the existing 12288 programs and 24 new programs.

Accordingly, the broadcasting server 100 configures the 512 first bit maps 300 corresponding to the service time information of each program on 512 channels (S400).

The broadcasting server then configures the second bit map 310 corresponding to the service time information of the new program on the new channel (S410).

The broadcasting server 100 identifies whether there are "1" bits in the third bit maps 320 resulting from repeated AND operations on the first bit maps 300 for each channel and the second bit map 310 (S420).

The broadcasting server 100 then identifies whether the number of the resulting third bit maps 320 having bits set to "1" exceeds 4 (S430).

The broadcasting server 100 does this because the broadcasting channel based on the BCMCS accepts even the case wherein programs in four channels between new channels and existing channels overlap.

When the number of third bit maps 320 having "1" bits exceeds 4 (YES in S430), the broadcasting server 100 determines that the program of the new channel cannot be arranged (S340). When the number of third bit maps 320 having "1" bits does not exceed 4 (NO in S430), the broadcasting server 100 determines that the program of the new channel can be arranged (S450).

According to the present invention, it is possible to perform a check for overlap to additionally arrange a new program in a minimum amount of time, as well as to efficiently manage a broadcasting schedule in a broadcasting system which provides broadcasting services using a variety of networks.

While the present invention has been described with reference to exemplary embodiments thereof, it will be understood by those skilled in the art that various changes in form and detail may be made therein without departing from the scope of the present invention as defined by the following claims.

What is claimed is:

1. A broadcasting system, comprising:
   a broadcasting server which uses a first bit map and a second bit map for determining whether service time information of a new program overlaps service time information of existing programs by comparing bit values of the first bit map with bit values of the second bit map, the first bit map being set in correspondence to service time information of each program on at least one channel, and the second bit map being set in correspondence to service time information of the new program,
   wherein the broadcasting server comprises:
   a schedule arrangement unit for arranging at least one program on each channel;

a bit map configuration unit for generating the first bit map in correspondence to the service time information of programs on said each channel arranged in the schedule arrangement unit, and for generating the second bit map in correspondence to the service time information of the new program; and an overlap check unit for determining whether the service time information of the new program overlaps the service time information of the existing programs by comparing the bit values of the first bit map with the bit values of the second bit map, and wherein the overlap check unit additionally arranges the new program according to bits set in a third bit map resulting from performing repeated AND operations on the first bit map and the second bit map.

2. The system according to claim 1, wherein the bit map configuration unit generates the first and second bit maps by dividing the service time period of the programs into units of one of days, weeks, months and years, and configures each bit map by dividing each bit of said each bit map into units of one of hours, minutes and seconds, and by setting bits of said each bit map in correspondence to the service time information of each program.

3. The system according to claim 1, wherein when there are bits set in the third bit map resulting from the repeated AND operations on the first bit map and the second bit map, the overlap check unit determines that there is an existing program which has service time information which overlaps the service time information of the new program.

4. The system according to claim 1, wherein the overlap check unit generates a third bit map resulting from repeated OR operations between first bit maps of respective channels, and determines that there is a program having service time information which overlaps the service time information of the new program when there are bits set in a fourth bit map resulting from an AND operation performed on the second bit map and the third bit map.

5. The system according to claim 1, wherein the overlap check unit comprises at least one thread to operate values of predetermined bits of each bit map.

6. A broadcasting server of a broadcasting system, comprising:

a schedule arrangement unit for arranging at least one program on each of at least one channel;

a bit map configuration unit for generating a first bit map set in correspondence to service time information of programs on each said at least one channel arranged in the schedule arrangement unit, and for generating a second bit map set in correspondence to service time information of a new program; and an overlap check unit for determining whether the service time information of the new program overlaps service time information of an existing program according to a third bit map generated by performing repeated AND operations on respective bits of the first bit map and the second bit map.

7. A broadcasting server of a broadcasting system, comprising:

a schedule arrangement unit for arranging at least one program on each of at least one channel;

a bit map configuration unit for generating a first bit map set in correspondence to service time information of programs on each said at least one channel arranged in the schedule arrangement unit, and for generating a second bit map set in correspondence to service time information of a new program; and an overlap check unit for generating a third bit map by performing repeated OR operations between a plurality of the first bit maps, and for determining that there is a program having service time information which overlaps the service time information of the new program when there are bits set in a fourth bit map generated by performing an AND operation on respective bits of the second bit map and the third bit map.

8. A broadcasting server of a broadcasting system, comprising:

a schedule arrangement unit for arranging at least one program on each of at least one channel (Flow ID) based on a Broadcast/Multicast Service (BCMS) standard;

a bit map configuration unit for generating a first bit map set in correspondence to service time information of programs on each said at least one channel arranged in the schedule arrangement unit, and for generating a second bit map set in correspondence to service time information of programs on a new channel; and an overlap check unit for determining that it is not possible to additionally arrange a new program according to a third bit map, generated by performing repeated AND operations on respective bits of the first bit map and the second bit map, when the number of channels having service time information which overlaps service time information of the new program exceeds a predetermined number.

9. A method of checking for broadcasting schedule overlap in a broadcasting system, comprising the steps of:

arranging at least one program on each of at least one channel;

configuring a first bit map in correspondence to service time information of the programs on each said at least one channel;

configuring a second bit map in correspondence to service time information of a new program; and determining whether the new program can be additionally arranged according to a third bit map generated by performing repeated AND operations on respective bits of the first bit map and the second bit map.

10. The method according to claim 9, wherein each of the steps of configuring the first and second bit maps, respectively, comprises the steps of:

generating a bit map by dividing a service time period of a program into units of one of days, weeks, months and years; and configuring the bit map by dividing each bit of the bit map into units of one of hours, minutes and seconds, and setting the bits of the bit map in correspondence to service time information of the program.

11. The method according to claim 9, wherein the step of determining whether the new program can be additionally arranged comprises the steps of:

generating the third bit map by performing an AND operation on the first bit map of a first channel and respective bits of a plurality of the first bit maps;

generating another third bit map by performing an AND operation on respective bits of a first bit map of a next channel and the second bit map when there are bits set in the third bit map;

arranging the new program additionally by selecting a corresponding channel as an additional channel when there are no bits set in the third bit map; and processing an additional arrangement of the new program as a failure when a current channel is the last channel.

12. The method according to claim 9, wherein the step of determining whether the new program can be additionally arranged comprises the steps of:

generating the third bit map by performing an AND operation on bits of the first bit map and the second bit map corresponding to a channel on which the new program is to be additionally arranged when the channel is determined; and determining that the new program cannot be arranged additionally when there are bits set in the third bit map.

13. The method according to claim 9, wherein the step of determining whether the new program can be additionally arranged comprises the steps of:

generating a fourth bit map by performing repeated OR operations on bits of the first bit map;

generating a fifth bit map by performing an AND operation on respective bits of the second bit map and the fourth bit map;

determining that there is a channel having a service time which overlaps a service time of the new program when there are bits set in the fifth bit map; and determining that there is no channel having a service time which overlaps the service time of the new program when there are no bits set in the fifth bit map.

14. A method of checking for broadcasting schedule overlap in a broadcasting system, comprising the steps of:

arranging at least one program on each of at least one channel;

configuring a first bit map in correspondence to service time information of the programs arranged on each said at least one channel;

configuring a second bit map in correspondence to service time information of a new program;

generating a third bit map by performing repeated OR operations on bits of the first bit map;

generating a fourth bit map by performing an AND operation on respective bits of the second bit map and the third bit map; and determining that there is a channel having a service time which overlaps a service time of the new program when there are bits set in the fourth bit map.

15. A method of checking for broadcasting schedule overlap in a broadcasting system, comprising the steps of:

configuring a first bit map in correspondence to service time information of each program on each of at least one channel (Flow ID) based on a Broadcast/Multicast Service (BCMS) standard;

configuring a second bit map in correspondence to service time information of programs on a new channel;

identifying whether there are bits set in a third bit map which is generated by performing repeated AND operations on bits of the first bit map and the second bit map; and determining that it is possible to additionally arrange programs when a number of third bit maps having bits set therein does not exceed a predetermined number.

* * * * *